2 Sheets—Sheet 1.

J. E. BOYLE.

FLUSHING APPARATUS FOR WATER CLOSETS.

No. 10,826. Reissued Apr. 19, 1887.

WITNESSES:

Geo. H. Fraser.

E. B. Bolton

INVENTOR:

James E. Boyle

By his Attorneys,

Burdg Fraser & Connelly

2 Sheets—Sheet 2.

J. E. BOYLE.

FLUSHING APPARATUS FOR WATER CLOSETS.

No. 10,826. Reissued Apr. 19, 1887.

WITNESSES:

Geo. H. Fraser.

E. B. Bolton

INVENTOR:

James E. Boyle

By his Attorneys,

Burke Fraser & Connett

UNITED STATES PATENT OFFICE.

JAMES E. BOYLE, OF BROOKLYN, NEW YORK.

FLUSHING APPARATUS FOR WATER-CLOSETS.

SPECIFICATION forming part of Reissued Letters Patent No. 10,826, dated April 19, 1887.

Original No. 291,139, dated January 1, 1884. Application for reissue filed January 2, 1885. Serial No. 151,880.

*To all whom it may concern:*

Be it known that I, JAMES E. BOYLE, a citizen of the United States, residing at Brooklyn, in the county of Kings and State of New York, have invented certain Improvements in Flushing Apparatus for Water-Closets, of which the following is a specification.

This invention relates to water-closets of the same general character as that described in my Patent No. 255,485, dated March 28, 1882, and has for its principal object to cheapen and simplify the overhead flushing apparatus.

Figure 1:
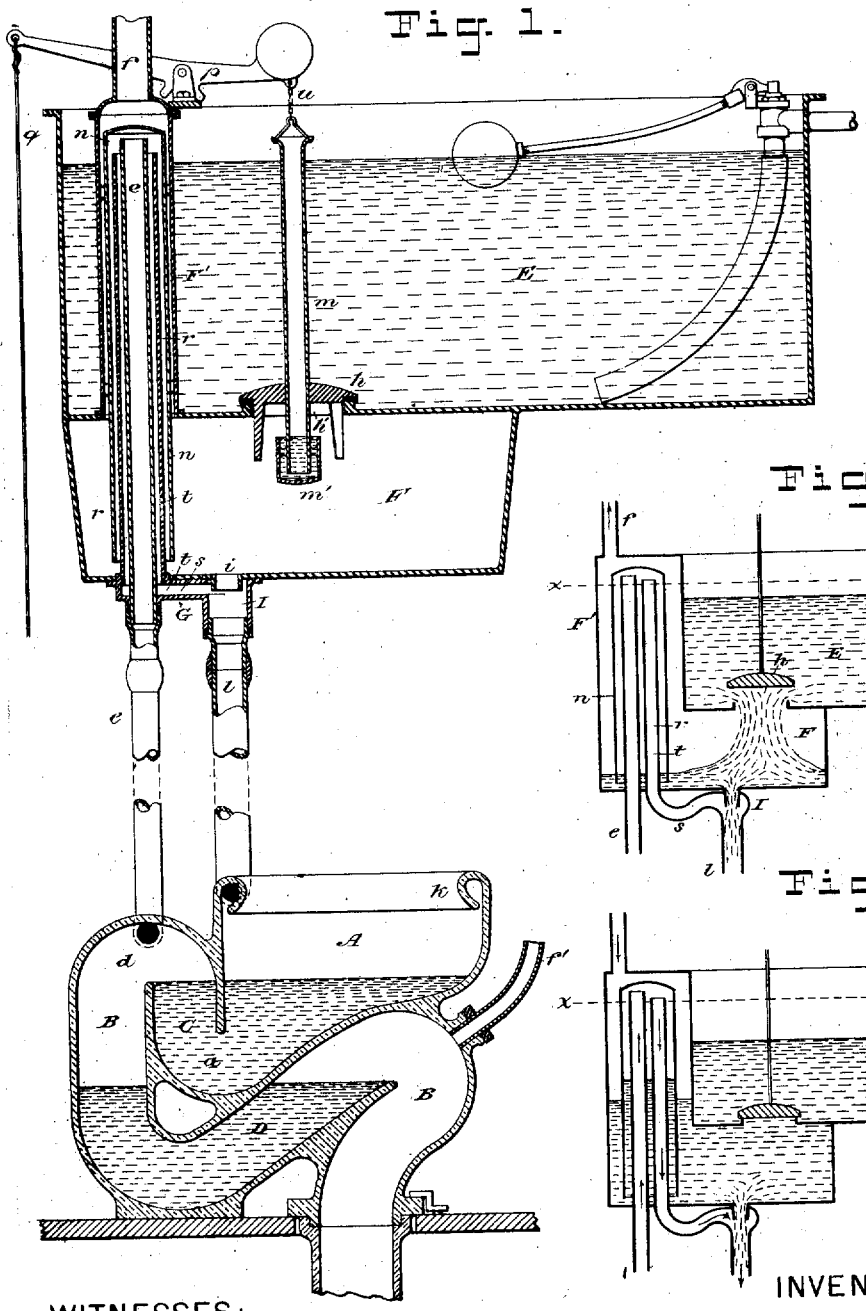
Figure 2:
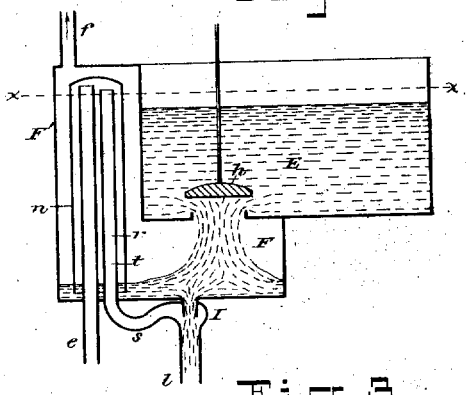
Figure 3:
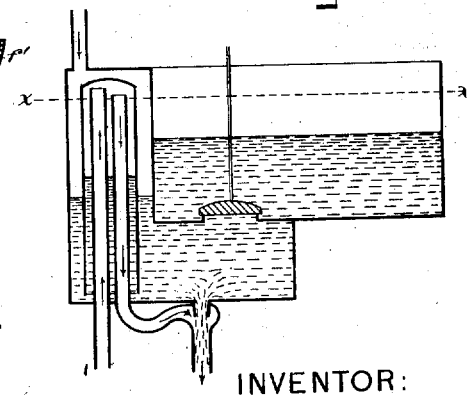
Figure 4:
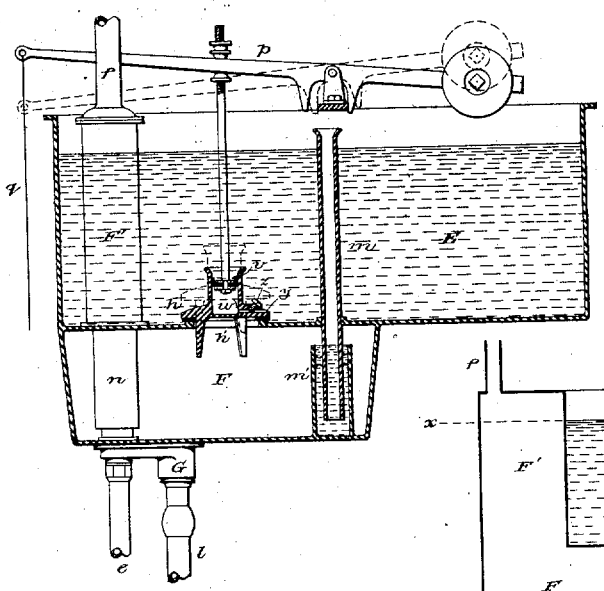
Figure 8:
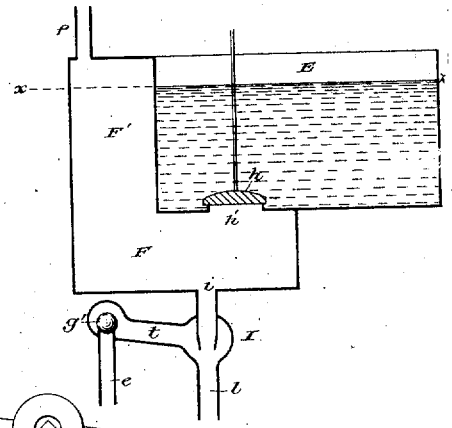
Figure 5:
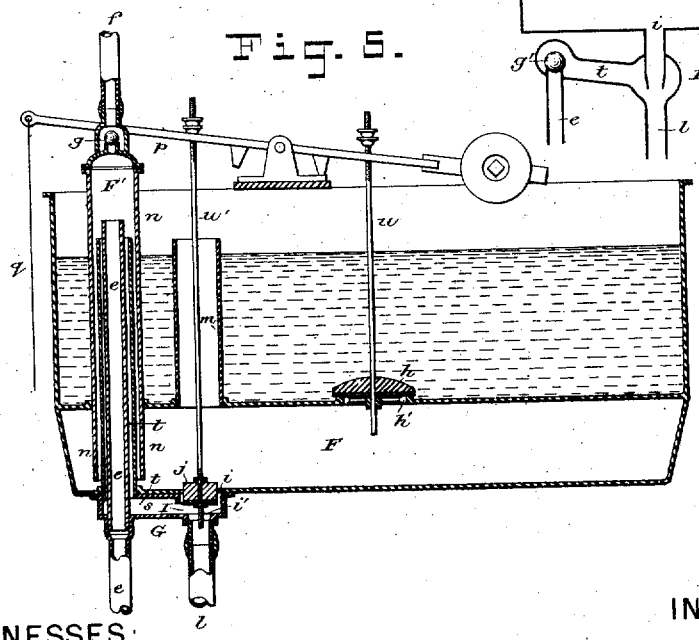

Figure 1 of the accompanying drawings shows the preferred form of my invention in vertical section, the tank being connected with a water-closet bowl of the character shown in my said patent. Figs. 2 and 3 are diagrams showing the same construction of tank in two different conditions. Figs. 4 and 5 are vertical sections of two modified forms of tanks; and Fig. 6 is a diagram showing another modification.

Referring to Fig. 1, A is the bowl, and B the soil-passage leading therefrom and forming traps C and D and intervening air-space, *d*. E is the service tank or cistern, supplied with water through a float-valve, which keeps it filled normally to the level shown. F is the flushing-chamber, *l* the flushing-pipe leading down from the bottom of this chamber to the flushing-rim *k* of the bowl, and *e* the air-pipe or suction-pipe leading from the air-space *d* to the top of the chamber F. These parts are all of substantially the same construction as the like-lettered parts in my said patent, except in the particulars hereinafter described. The chamber F is arranged wholly below the tank E, with the exception of an upward extension through the tank formed by a tube, F′, to the top of which the vent-pipe *f* is connected. There need be no check-valve in this pipe. The suction-pipe *e* rises through the chamber F, inside the tube F′, and nearly to the top of the latter, its open upper end being above the water-level in the tank. Inside the tube F′ is fixed a tube or air-bell, *n*, the top of which extends slightly above the top of the pipe *e*, and is closed, and the bottom of which is open and extends nearly to the bottom of the chamber F. Inside of the tube *n*, and between it and the pipe *e*, is placed a pipe, *r*, the upper end of which is open and extends preferably above the water-level in the tank E, but not so high as the top of the pipe *e*, and the bottom of which extends through the bottom of the chamber F and connects with a passage-way, *s*, formed in a casting, G, which is fastened beneath the chamber. This casting extends to the right, and the outlet-orifice *i* at the bottom of the chamber opens into it. Beneath this orifice the flushing-pipe *l* is connected to the casting G. The orifice *i* is surrounded with a pendent flange or short downwardly-projecting tube which depends into the casting G, and this orifice and casting, in connection with the flushing-pipe *l*, form a suction-injector, I, the operation of which causes a suction through the passage (lettered *t*) formed by the tube *r* and passage-way *s*, as will be presently explained.

There is but one valve—the flushing-valve *h*—which closes the inlet-opening *h′* to the chamber F. This opening should be about three inches in diameter, and the outlet-orifice *i* should be about three-fourths or seven-eighths of an inch in diameter, or the two may be of other dimensions in approximately the same proportion. The valve *h* is connected by a stem or chain to a weighted lever, *p*, which keeps the valve normally closed, and is operated to open it by a pull connected to it through a wire or chain, *q*, in any usual manner. The overflow-pipe *m* is shown as passing through the valve *h* and serving as its stem. This pipe is trapped by a cup, *m′*, which incloses its lower end and rises and falls with it.

In my said patent the flushing-chamber F is a sealed chamber and operates during the flushing to produce a suction in the pipe *e* by means of a vacuum. In my present invention the flushing-chamber is not sealed, and consequently is not a vacuum-chamber, and the suction is produced by the action of the injector I, as will presently be described.

The operation of my invention will be best understood from the diagrams, Figs. 2 and 3. In these the pipe *e* is not shown as passing through the pipe *r*, but for clearness the two are placed side by side, and the bell *n* and upward extension F′ are exaggerated. The normal water-level in the tank E is shown by the line *x x*. The parts are shown in Fig. 1 in their normal condition, the chamber F being empty and the valve *h* closed. When the person using the closet pulls down on the wire or chain *q* through the usual pull-handle or other suitable appliance, the valve *h* is lifted and water from the tank E commences to flow rapidly into the chamber F, and immediately thereafter to flow outward through the orifice *i*. Fig. 2 shows the parts in this condition. As the inlet-orifice *h'* has about sixteen times the area of the outlet-orifice *i*, the water enters the chamber F much more rapidly than it can escape from it and quickly fills the chamber, expelling the air through the tube F' and pipe *f*. By the time the chamber is thus filled the water running out through the orifice *i* and descending the flushing-pipe will commence to flow into the bowl A, and the user hearing it will then naturally release the pull, whereupon the valve *h* will drop back to its seat. The water contained in the flushing-chamber will then continue to flow out through the orifice *i* until the chamber is emptied. Fig. 3 shows the apparatus shortly after the valve *h* is closed. From the time the water entering the chamber reaches the orifice *i* until the chamber is emptied there is a continuous stream of water flowing out through this orifice, falling through the cavity or injector-chamber in the casting G and flowing down the flushing-pipe. In crossing the cavity in the casting it encounters and carries with it a portion of air, and so creates a partial vacuum in this cavity in the manner common to injectors. This partial vacuum or suction extends up through the passage *t* into the bell *n*, from which it draws the air for an instant, and until the water in the chamber F rises above the bottom end of this bell, and so seals it and prevents any further flow of air into it. The rarefaction rapidly increases from that instant, and air is drawn up through the pipe *e* and from the space *d*. The effect of this rarefaction is to siphon the trap C, or cause the water to flow over from this trap and fall into the trap D, and this siphoning proceeds rapidly until the water-level in the bowl A is lowered to the outlet-opening *a*, whereupon air enters the space *d* from the bowl and breaks the vacuum. This breaking of the vacuum should occur shortly after the first of the flushing-water reaches the bowl, and thereafter the water enters the bowl and is as rapidly drawn out by the siphoning of the trap, thereby causing a powerful outflow through the bowl and soil-passage, which carries with it the entire contents of the bowl. In the course of this operation the vacuum may be broken several times by entrance of air from the bowl. In any case the rarefaction in the bell *n* will cause the water to rise to a greater height in it than in the chamber F, as shown in Fig. 3, and if the suction is sufficiently strong the water in the bell will be drawn up to the top of the pipe *r*, and will descend through the passage *t* mixed with air. Thus the water will be drawn from the chamber F to the pipe *l* through two conduits simultaneously. The rarefaction in the bell *n*, pipe *c*, and space *d* will continue until the water in the chamber has so far run out as to unseal the bottom of the bell, whereupon the vacuum is broken finally by the entrance of air into the bell, and thereupon the remaining water will flow into the bowl as an "after-wash," and will fill it up to the level shown, leaving it ready for the next use of the closet. The precise operation will depend upon the proportioning of the parts, as by altering the relative capacities of the trap C, space *d*, pipe *e*, bell *n*, passage *t*, and chamber F, and the relative areas of the orifices *h'* and *i* the operation might be considerably modified.

I have stated that the person using the closet will naturally release the pull when he hears the water pouring into the bowl, and if the parts are so proportioned that when this occurs the chamber F will be filled the operation will almost invariably be satisfactory. If he should release the pull too quickly, the only result would be a proportionately shorter flush, and if he should hold the pull too long the flush would be unnecessarily prolonged, the only disadvantage of which would be a waste of more or less water. To prevent the latter contingency a self-seating valve may be used as the flushing-valve. The valve shown in my Patent No. 249,577, dated November 17, 1881, will answer the purpose well.

Fig. 4 shows a modification in which a valve of this character is used in connection with a different lever arrangement. The wire *q* is to be connected to the water-closet seat, and the weight on the lever tends to lift the valve. The parts are shown in full lines in the normal position. When the seat is depressed the lever is tilted to the position shown in dotted lines, thereby forcing down the piston *v* in the cylinder *w*, which is fixed to the valve *h*. The piston has a cupped leather packing, which permits the water to escape around it during its downward movement. The parts remain thus until the user rises from the seat, whereupon the lever is tilted by its counter-weight back to its normal position and the piston *v* is lifted. The piston in lifting carries with it, by suction, the cylinder *w*, and so lifts the valve *h* to the position shown in dotted lines. The cylinder *w* has a small inlet-conduit or leak-passage, *y*, adjusted by a screw, *z*, and as water slowly enters through this conduit the valve slowly descends, and finally seats itself. The adjustment should be such that the valve will seat itself as soon as the chamber F is filled. In other respects the operation is the same as already described. The overflow-pipe *m* is placed at one side and fixed in place and its lower end is sealed in a fixed cup, *m'*.

Fig. 5 shows how two valves may be used, the arrangement of the valves and the lever being the same as in my said Patent No. 255,485. The outlet-orifice *i* is made larger than in the construction before described, and the valve $j$, fixed to the stem $u'$, works up and down through this orifice, and when lowered seats itself on the bottom of the casting G over the orifice $i'$, whence the flushing-pipe leads. The valve $j$ nearly fills the orifice $i$, the area of the intervening annular space being about the same as of the orifice $i$ in Fig. 1. The two valves are so arranged that when the lever is at mid-stroke both are seated; but when the lever is at either extremity of its stroke one valve is seated and the other is lifted. The upward extension F' and bell $n$ are no longer distinct, and a check-valve, $g$, is interposed between the interior of the bell and the air-pipe $f$ leading from its top.

The parts are shown in their normal position. When the seat is depressed, the valve $j$ is seated and the valve $h$ is lifted. The chamber F is quickly filled through the orifice $h'$, and water flows thence into the bell $n$, the air therein escaping through the valve $g$. Water also flows through the annular opening $i$, and fills the passage $t$ to the same level. The chamber F, bell $n$, and passage $t$ remain full until the seat is released, whereupon the valve $h$ closes and the valve $j$ opens. The water from the passage $t$ and chamber F then commences to run out into the pipe $l$, the former flowing the more rapidly and instantly producing a suction, which should suffice to lift the water in the bell $n$ and cause it to flow down the passage $t$. The water from the chamber F flows out through the annular orifice $i$, and descends through the flushing-pipe, and acts to cause a suction or rarefaction in the same manner as in Fig. 1. This construction causes a more powerful and rapid suction than the other; but I prefer that first described, because of its greater cheapness, as its action is practically sufficient.

It will be seen that my present invention introduces a new principle for operating double-trapped or siphon water-closets—namely, that of producing the requisite vacuum by causing the falling flushing-water to act as an injector and draw air along with it. I have combined with this a means for securing the requisite after-wash to refill the bowl at the termination of the flushing, which means is practically the same as that set forth in my said Patent No. 255,485; but it is not essential that this particular means of securing the after-wash be used.

The diagram, Fig. 6, is designed to illustrate the essential principle of my present invention even more clearly than the preceding figures. The air-pipe $e$ does not enter the chamber F, but is connected by a branch with the flushing-pipe $l$ below the chamber, the injector I being arranged at their junction. The check-valve $g'$ is shown merely to prevent water setting back and flowing down the pipe $e$, since the top of this pipe is below the water-level $x$ $x$, instead of above it, as before. When the flushing-valve $h$ is lifted, the water from the tank E flows down the flushing-pipe $l$, and through the injector I, thus drawing air from the pipe $e$ during the whole time that the water continues to flow through the injector. In this construction the chamber F has no function of its own, and constitutes, essentially, a mere enlargement of the upper portion of the flushing-pipe, to the same effect as the ordinary "service-box" commonly used by plumbers. No provision for securing an after-wash is here shown; but the bowl may be refilled after the flushing by any suitable means—as, for instance, by water admitted by a valve through an independent flushing-pipe, as shown in the patent of Peters & Donald, No. 260,232, dated June 27, 1882.

I claim as my invention—

1. A water-closet consisting of a bowl, with the soil-passage leading therefrom and two successive traps in said passage, in combination with a flushing-pipe for conveying water to the bowl, a suction-injector arranged in connection with said pipe and to be traversed by the flushing-water, and an air-pipe leading from the air-space between said traps and communicating with said injector, substantially as set forth, whereby the flow of water through said injector serves to draw air from said air-space.

2. A flushing apparatus for water-closets, consisting of the combination of a reservoir-tank, a flushing-valve controlling the outlet thereof, a flushing-pipe for conveying water therefrom to the bowl of the closet, a suction-injector arranged in connection with said pipe and to be traversed by the descending flushing-water, and a suction-pipe in connection with said injector, whereby the water in flowing from said tank downward through the flushing-pipe traverses said injector and sucks the air from said suction-pipe.

3. The combination of a reservoir-tank, a flushing-chamber, a valve controlling the admission of water from said tank to said chamber, a suction pipe communicating with the interior of said chamber, an injector beneath the outlet from said chamber, a flushing-pipe leading downward from said injector, and a suction-passage affording communication from said injector to said suction-pipe, substantially as and for the purposes set forth.

4. A flushing apparatus for water-closets, consisting of a reservoir-tank, a flushing-valve controlling the outlet thereof, a flushing-pipe for conveying water therefrom to the bowl of the closet, a suction-injector arranged in connection with said pipe and to be traversed by the descending flushing-water, and a suction-pipe in connection with said injector, whereby the passage of water through said injector will suck the air from said suction-pipe, all combined together, and with a trapped air-passage communicating with the said suction-pipe and arranged to be unsealed and thereby to admit air to the suction-pipe and break the vacuum therein before the cessation of the flow of flushing-water, substantially as set forth.

5. The combination of the tank E, the chamber F, provided with inlet-orifice $h'$ and outlet-orifice $i$, the valve $h$, the suction-injector I, the flushing-pipe $l$, the air-pipe $e$, the suction-passage $t$, and the air-bell $n$, substantially as set forth.

6. A flushing apparatus for a water-closet, consisting of the combination of a reservoir-tank, a flushing-chamber provided with an inlet-orifice of large area, communicating with said tank and with an outlet-orifice of contracted area proportioned to the area of said inlet-orifice, substantially as specified, a valve adapted to close said inlet-orifice, an air-pipe opening into said flushing-chamber, and a flushing-pipe leading from said outlet-orifice, all arranged and adapted to operate substantially as set forth.

In witness whereof I have hereunto signed my name in the presence of two subscribing witnesses.

JAMES E. BOYLE.

Witnesses:
ARTHUR C. FRASER,
GEO. BAINTON.